(No Model.)
B. F. MYERS.
COMBINED CAN, PUMP, AND MEASURE.
No. 275,934. Patented Apr. 17, 1883.
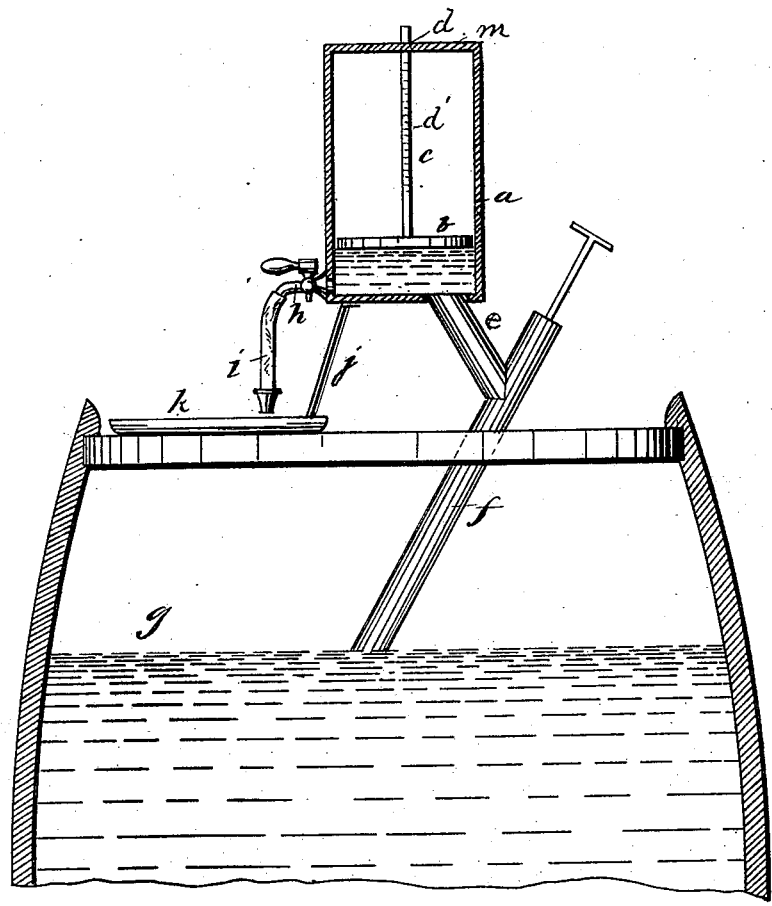
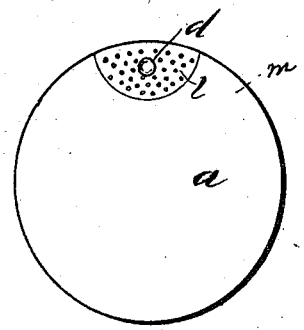
WITNESSES:
Chas. T. Howell,
C. Sedgwick
INVENTOR:
B. F. Myers
BY Munn & Co
ATTORNEYS.

UNITED STATES PATENT OFFICE.

BENJAMIN F. MYERS, OF HUNNEWELL, KENTUCKY.

COMBINED CAN, PUMP, AND MEASURE.

SPECIFICATION forming part of Letters Patent No. 275,934, dated April 17, 1883.

Application filed September 19, 1882. (No model.)

*To all whom it may concern:*

Be it known that I, BENJAMIN F. MYERS, of Hunnewell, in the county of Greenup and State of Kentucky, have invented a new and Improved Combined Can Pump and Measure, of which the following is a full, clear, and exact description.

My invention consists of a can containing a float of the same diameter as the can, and a measuring-scale, and having a faucet for the discharge of the contents, and being connected with a pump adapted to pump any liquid substance from a cask or other package into the can, to be measured therein by the scale, and thus be discharged into the can or other vessel to be filled, the object being to provide retail dealers in liquids with better and more expeditious, economical, and safer apparatus for dealing out liquids in small quantities than are now in use, all as hereinafter fully described.

Reference is to be had to the accompanying drawings, forming part of this specification, in which similar letters of reference indicate corresponding parts in both the figures.

Figure 1 is a sectional elevation of a cask with my improved measuring-funnel attached. Fig. 2 is a top view of the can or funnel.

I take a can, *a*, of any improved form or size, and fit a float, *b*, in it, having a stem, *c*, with a graduated scale, *d'*, on it, indicating the quantity of liquid in the can by the rise of the stem through a hole, *d*, in the top of the can, and I connect a pump, *f*, of any kind with it, by a pipe, *e*, entering the bottom of the can *a*, suitably for pumping the liquid to be measured into it from the tank or cask *g*, containing it, so that it may be ascertained by the scale when the desired quantity is in the can. Besides the pump, I connect a faucet, *h*, at the bottom of the can for drawing off the ascertained quantity into the customer's can, and will connect a flexible hose, *i*, to the faucet, if desired, for conducting the liquid from the faucet into the vessel to be filled. This can *a* is mounted on legs *j*, to support it on the head or top of a barrel, tank, or other vessel from which the liquid is to be taken. A drip-pan, *k*, may be placed under the faucet for catching the waste, and the top of the can *a* is perforated, as at *l*, for venting the interior.

It will readily be seen that with a measuring-faucet of this contrivance liquid substances may be more rapidly, safely, and economically measured out than with the common devices used for the purpose. The device may be detachably connected to the cask, so as to be shifted from one to another; but it will be best to employ one with each cask.

I am aware that an oil-can having attached within it a force-pump, a measure, and a float of less diameter than the can, the parts being so constructed and arranged that the oil may be pumped from a cask either into the can itself or into the contained measure, the latter being provided with a gage which at all times shows how much oil the measure contains, has heretofore been employed, and I therefore lay no claim to such construction, my invention being confined to the construction and arrangement of parts pointed out in the claim, whereby the construction and arrangement of the parts are rendered much simpler, cheaper, and different.

Having thus fully described my invention, I claim as new and desire to secure by Letters Patent—

The combination, with the cask *g* and pump *f*, having its barrel passing through a hole in the head of the cask, and provided with a pipe, *e*, connecting the pump-barrel with the bottom of the measure, of the cylindrical can *a*, provided with legs *j*, adapted to support it on the head of the cask, faucet *h*, at the bottom of the can, the latter having its top perforated at *l*, and provided with a hole, *d*, float *b*, of the same diameter as the cylindrical can, and stem *c*, provided with the graduated scale *d'*, substantially as shown and described.

BENJAMIN F. MYERS.

Witnesses:
I. N. KONNS,
GEO. A. CORUM.